(12) United States Patent
Pellore (10) Patent No.: US 8,130,413 B1
(45) Date of Patent: Mar. 6, 2012

(54) TRAPPING OBJECTS

(75) Inventor: Aditya Pellore, Andhra Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 782 days.

(21) Appl. No.: 12/147,473

(22) Filed: Jun. 26, 2008

(51) Int. Cl.
*H04N 1/60* (2006.01)

(52) U.S. Cl. ...... 358/1.9; 358/1.15; 358/3.26; 358/3.28; 382/103; 382/124; 382/167; 382/190

(58) Field of Classification Search .................. None
See application file for complete search history.

(56) References Cited

U.S. PATENT DOCUMENTS

| | | | |
|---|---|---|---|
| 5,523,775 A * | 6/1996 | Capps | 345/179 |
| 5,542,052 A * | 7/1996 | Deutsch et al. | 345/589 |
| 5,581,667 A * | 12/1996 | Bloomberg | 358/1.9 |
| 5,668,931 A * | 9/1997 | Dermer | 358/1.4 |
| 5,923,821 A * | 7/1999 | Birnbaum et al. | 358/1.9 |
| 6,009,195 A * | 12/1999 | Nakata et al. | 382/175 |
| 6,262,747 B1 * | 7/2001 | Rocheleau et al. | 345/620 |
| 6,345,117 B2 * | 2/2002 | Klassen | 382/167 |
| 6,577,777 B1 * | 6/2003 | Yoshino et al. | 382/284 |
| 6,594,030 B1 * | 7/2003 | Ahlstrom et al. | 358/1.15 |
| 6,654,145 B1 * | 11/2003 | Speck | 358/1.9 |
| 6,697,078 B2 | 2/2004 | Becker et al. | |
| 6,738,159 B2 * | 5/2004 | Harrington | 358/1.9 |
| 6,987,585 B1 * | 1/2006 | Becker | 358/1.9 |
| 7,075,551 B2 | 7/2006 | Becker et al. | |
| 7,139,098 B2 * | 11/2006 | Klassen | 358/1.9 |
| 7,173,738 B2 * | 2/2007 | Kohn | 358/2.1 |
| 7,187,471 B1 | 3/2007 | Dermer et al. | |
| 7,196,816 B2 * | 3/2007 | Watanabe | 358/1.9 |
| 7,362,467 B1 * | 4/2008 | Tsukimura | 358/1.9 |
| 7,379,585 B2 * | 5/2008 | Manki | 382/162 |
| 7,382,494 B2 * | 6/2008 | McElvain | 358/2.1 |
| 7,391,536 B2 * | 6/2008 | McElvain | 358/1.9 |
| 7,616,344 B2 * | 11/2009 | Segawa et al. | 358/1.9 |
| 7,710,609 B2 * | 5/2010 | McElvain | 358/3.27 |
| 7,724,393 B2 * | 5/2010 | Segawa et al. | 358/1.9 |
| 2002/0085005 A1 * | 7/2002 | Becker et al. | 345/443 |
| 2006/0028670 A1 * | 2/2006 | Amano | 358/1.13 |
| 2006/0033961 A1 * | 2/2006 | Allen | 358/3.26 |
| 2008/0055654 A1 * | 3/2008 | Tamura | 358/3.26 |
| 2008/0158614 A1 * | 7/2008 | Segawa | 358/3.29 |
| 2011/0090522 A1 * | 4/2011 | Jia et al. | 358/1.9 |

* cited by examiner

*Primary Examiner* — King Poon
*Assistant Examiner* — Dung Tran
(74) *Attorney, Agent, or Firm* — Robert C. Kowert; Meyertons, Hood, Kivlin, Kowert & Goetzel, P.C.

(57) ABSTRACT

Trapping objects. An object of a first type, for example, a text is detected in a section of a page. An object of a second type, for example, a stroke is then detected in the section. A check is then performed to determine if the object of the second type adjoins the object of the first type. One or more parameters, for example trapping parameters associated with the object of the first type are applied to the object of the first type and to the object of the second type, if it is determined that the object of the second type adjoins the object of the first type.

24 Claims, 7 Drawing Sheets

TRAPPING OBJECTS

BACKGROUND

During a printing process, when a paper passes through printing units, various ink colors are applied. Often the paper or plates applying the ink can shift resulting in improper alignment among two or more objects. The improper alignment results in gaps, which become prominent when two or more objects with contrasting colors abut. The appearance of gaps is called misregistration. Trapping is a process of compensating for misregistration on the printing units by printing small areas of overlapping colors where objects meet. Trapping helps in minimizing the gaps.

Figure 1:
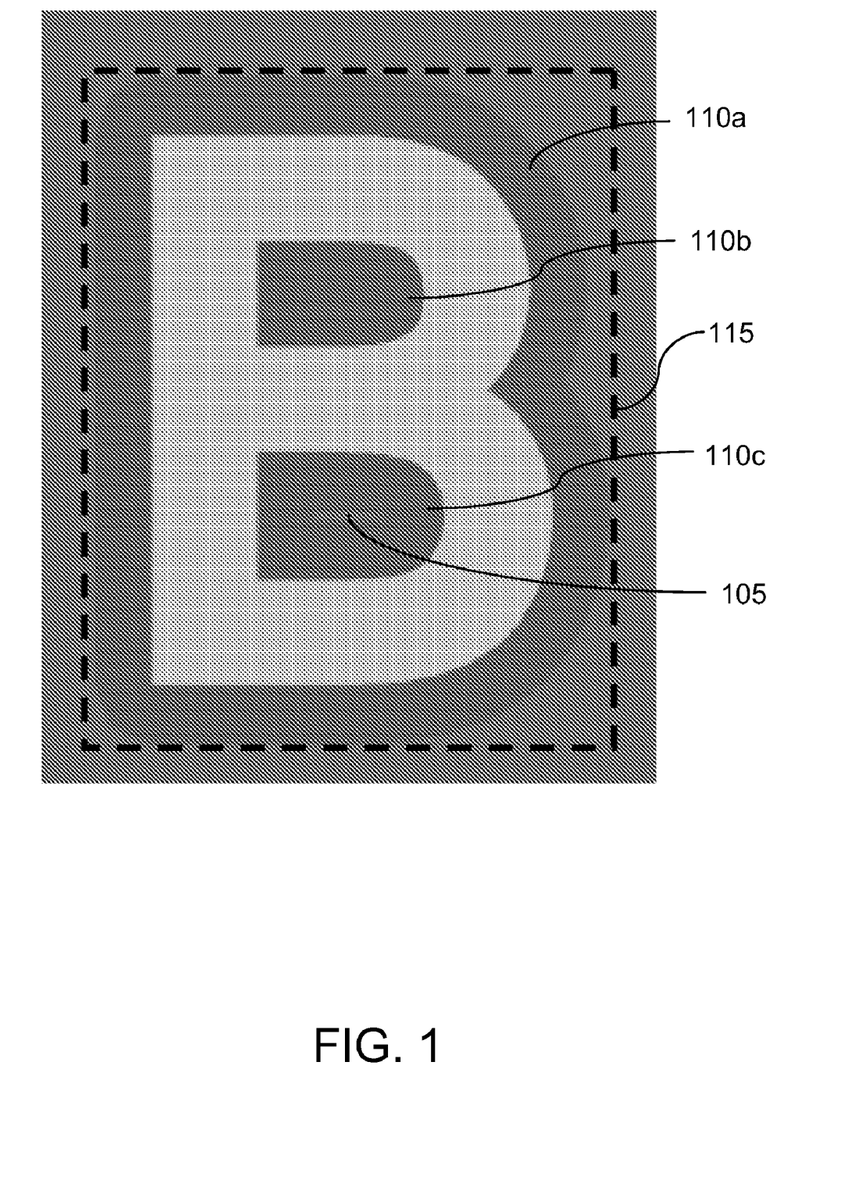
FIG. 1 is a representation of a combination object and traps in accordance with prior art.

Trapping for objects such as text is performed differently by applying different rules as compared to the rules applied to line arts such as stroke. Often the stroke is used around the text to make the text appear bold. The stroke gels with the text to make the text and the stroke appear as a combination object. However, trapping rules for the text differ from trapping rules for the stroke resulting in an unpleasant appearance of the combination object when trapped. For example, FIG. 1 illustrates a trapped combination object 115 which is a combination of a trapped text (letter "B") and a trapped stroke (not distinguishable as text and stroke are in same color). Traps 110a, 110b and 110c have thick width resulting in an unpleasant appearance. Further, traps 110b and 110c present at inner side of combination object 115 spread over background 105 and affect the overall appearance.

In light of the foregoing discussion, there is a need for an efficient technique for trapping objects.

SUMMARY

Embodiments of the present disclosure described herein provide a method, system and machine-readable medium for trapping objects.

An example computer implemented method includes detecting an object of a first type in a section of a page. An object of a second type is then detected in the section. A check is performed to determine if the object of the second type adjoins the object of the first type. Further, trapping parameters associated with the object of the first type are applied to the object of the first type and to the object of the second type, if it is determined that the object of the second type adjoins the object of the first type.

Another example computer implemented method includes detecting a text in a section of a page. A stroke is then detected in the section. A check is performed to determine if the stroke adjoins the text. Further, the text and the stroke are trapped based on one or more parameters associated with the text, if it is determined that the stroke adjoins the text.

Yet another example computer implemented method includes receiving one or more polygons of a section of a page. An object of a first type is then detected in at least one polygon. Thereafter, a line is defined at a predetermined distance from the at least one polygon. A check is performed to determine if an object of a second type is present between the line and the at least one polygon. Trapping rules associated with trap width of the object of the first type are then applied to the object of the first type and to the object of the second type, if it is determined that the object of the second type is present between the line and the at least one polygon.

An example system includes a first detection module for detecting an object of a first type in a section of a page. The system also includes a second detection module for detecting an object of a second type in the section. Further, the system includes an application module for applying trapping parameters associated with the object of the first type to the object of the first type and to the object of the second type, if the object of the second type adjoins the object of the first type.

An example machine-readable medium includes instructions operable to cause a programmable processor to perform detecting an object of a first type in a section of a page. An object of a second type is then detected in the section. A check is performed to determine if the object of the second type adjoins the object of the first type. Further, the object of the first type and to the object of the second type are trapped based on one or more parameters associated with the object of the first type, if it is determined that the object of the second type adjoins the object of the first type.

DETAILED DESCRIPTION OF THE EMBODIMENTS

Figure 2:
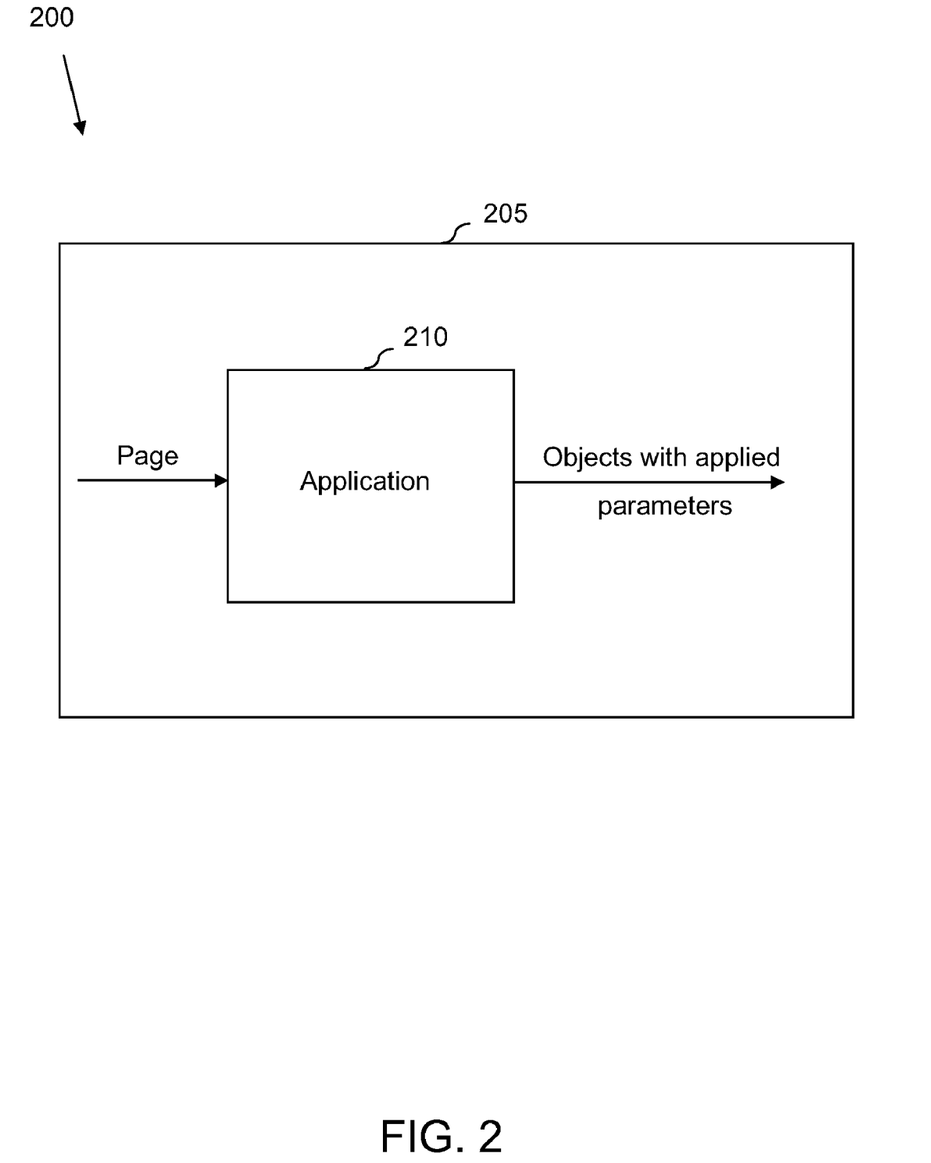
FIG. 2 is a block diagram of an environment in accordance with one embodiment.

FIG. 2 is a block diagram of an environment 200 in accordance with one embodiment. Environment 200 includes a system 205 with an application 210 running on system 205. System 205 may be a processing device. Examples of system 205 include but are not limited to computers, laptops, Personal Digital Assistants (PDAs) and mobile devices.

In one embodiment, application 210 includes a printing platform, for example, Adobe® PDF Print Engine. In another embodiment of the present disclosure, application 210 includes a trapping platform, for example, Adobe® PDF Print Engine. In yet another embodiment of the present disclosure, application 210 includes a platform, for example, a Configurable PostScript Interpreter (CPSI), InDesign®, PostScript®, PostScript® 3™ and PostScript® 3i™ for generating output for various output devices, for example, image setters, color proofers and printers. In still another embodiment of the present disclosure, application 210 includes any printing, prepress or trapping application.

In one embodiment, application 210 receives a page as an input and applies one or more parameters associated with an object on the page to the object and to another object adjoining the object.

In one embodiment, the page is a part of an electronic document.

It will be appreciated that the page may be written, inserted, imported, drawn, copied or provided to application 210.

In one embodiment, the object includes a visible entity which is acted upon. The object may be a vector object or a bitmap object.

It will be appreciated that application 210 may include any application in which it is desirable to apply the one or more parameters associated with the object to the object and to another object adjoining the object while performing one or more functions, for example, trapping. Trapping is a process of compensating for misregistration on a printing press.

Figure 3:
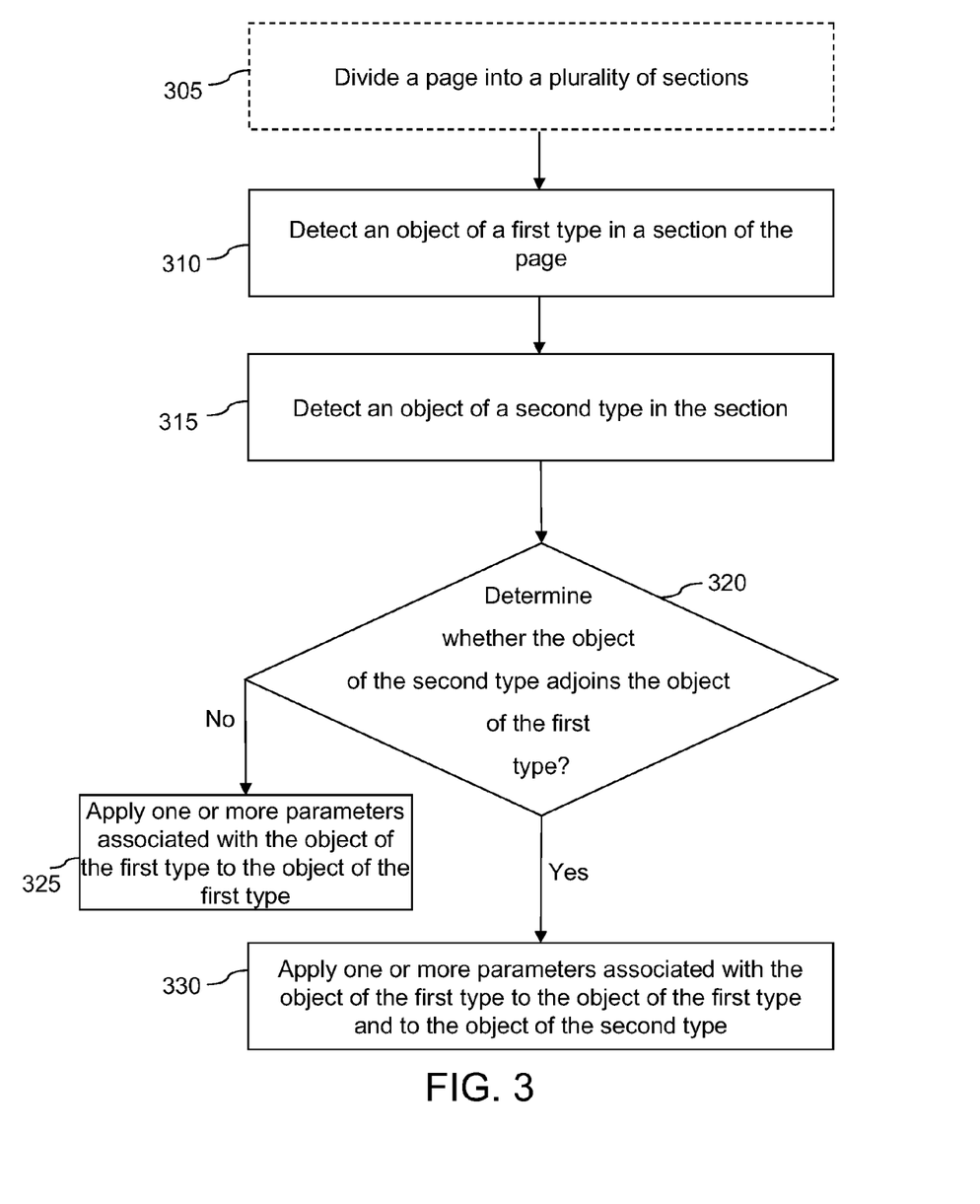
FIG. 3 is a flow diagram illustrating a method for applying one or more parameters to objects in accordance with one embodiment.

The method of applying the one or more parameters to the object and to another object adjoining the object is explained in detail in conjunction with FIG. 3.

FIG. 3 is a flow diagram illustrating a method for applying one or more parameters to objects in accordance with one embodiment.

At step 305, a page is divided into a plurality of sections. Each section includes one or more polygons. A polygon may include a line. A page may include one or more sections.

The size of each section may be predefined, for example, 2×2 inches. In another aspect, the size of a section may be defined by a user.

It will be appreciated that the sections may be in any shape as desired, for example, rectangular.

In one embodiment, step 305 may be bypassed and one or more polygons of a section may be received.

In one embodiment, one or more steps from steps 310 to 330 are performed for each section.

At step 310, an object of a first type is detected in the section of the page. The object of the first type is detected by determining presence of a polygon including the object of the first type. Iterations may be performed over the one or more polygons to determine if the one or more polygons include the polygon including the object of the first type.

In one embodiment, the object of the first type includes a visible entity which is acted upon. Examples of the object of the first type include but are not limited to a textual element, a text, a picture, an image, a graphical element, and a drawing.

It will be appreciated that the object of the first type may include any object having distinct trapping parameters.

In one embodiment, step 305 may be included in step 310.

At step 315, an object of a second type is detected in the section. The object of the second type is detected by determining presence of a polygon including the object of the second type.

At step 320, a check is performed to determine whether the object of the second type adjoins the object of the first type. In one embodiment, the check is performed by determining whether the object of the second type is present within a predefined distance from the object of the first type. A line may be defined at a predefined distance from the object of the first type or the polygon including the object of the first type. In some embodiments, the predefined distance may be three points. A point may be equal to seventy second part (1/72) of an inch.

If the object of the second type or the polygon including the object of the second type is present between the object of the first type and the line, then the object of the second type is identified as the object of the second type adjoining the object of the first type.

In one embodiment, the object of the second type includes a visible entity. Examples of the object of the second type include but are not limited to a stroke and a fill.

If the object of the second type adjoins the object of the first type then step 330 is performed. At step 330, one or more parameters associated with the object of the first type are applied to the object of the first type and to the object of the second type.

In one embodiment, applying the one or more parameters includes applying trapping parameters associated with the object of the first type. The trapping parameters include parameters associated with width of a trap. The one or more parameters also include rules associated with the object of the first type. For example, a rule may include that if the size of the object of the first type is smaller than a threshold then the object of the first type is trapped with a trap with that is 10 times thinner than the trap width of the other objects which are not smaller than the threshold. The object of the second type adjoining the object of the first type is then also trapped with the trap width that is 10 times thinner. The rules may be predefined or may be defined by the user.

It will be appreciated that the one or more parameters applied to the object of the second type may be in a pre-defined ratio to the one or more parameters associated with the object of the first type. The pre-defined ratio may be defined by a user.

It will also be appreciated that the one or more parameters associated with the object of the second type may be applied to the object of the first type based on the type of objects, user needs or functions that needs to be performed on both the objects.

If at step 320 it is determined that the object of the second type does not adjoin the object of the first type then step 325 is performed. At step 325, the one or more parameters associated with the object of the first type are applied to the object of the first type.

It will be appreciated that one or more steps from steps 310 to 330 may be performed simultaneously or one by one for each section.

In one embodiment, one or more steps of the method described in FIG. 3 may be implemented by means of instructions included in a machine-readable medium. Examples of such a medium include but are not limited to memory devices, tapes, disks, cassettes, integrated circuits, servers, magnetic media, optical media, online software, download links, installation links, and online links.

Figure 4:
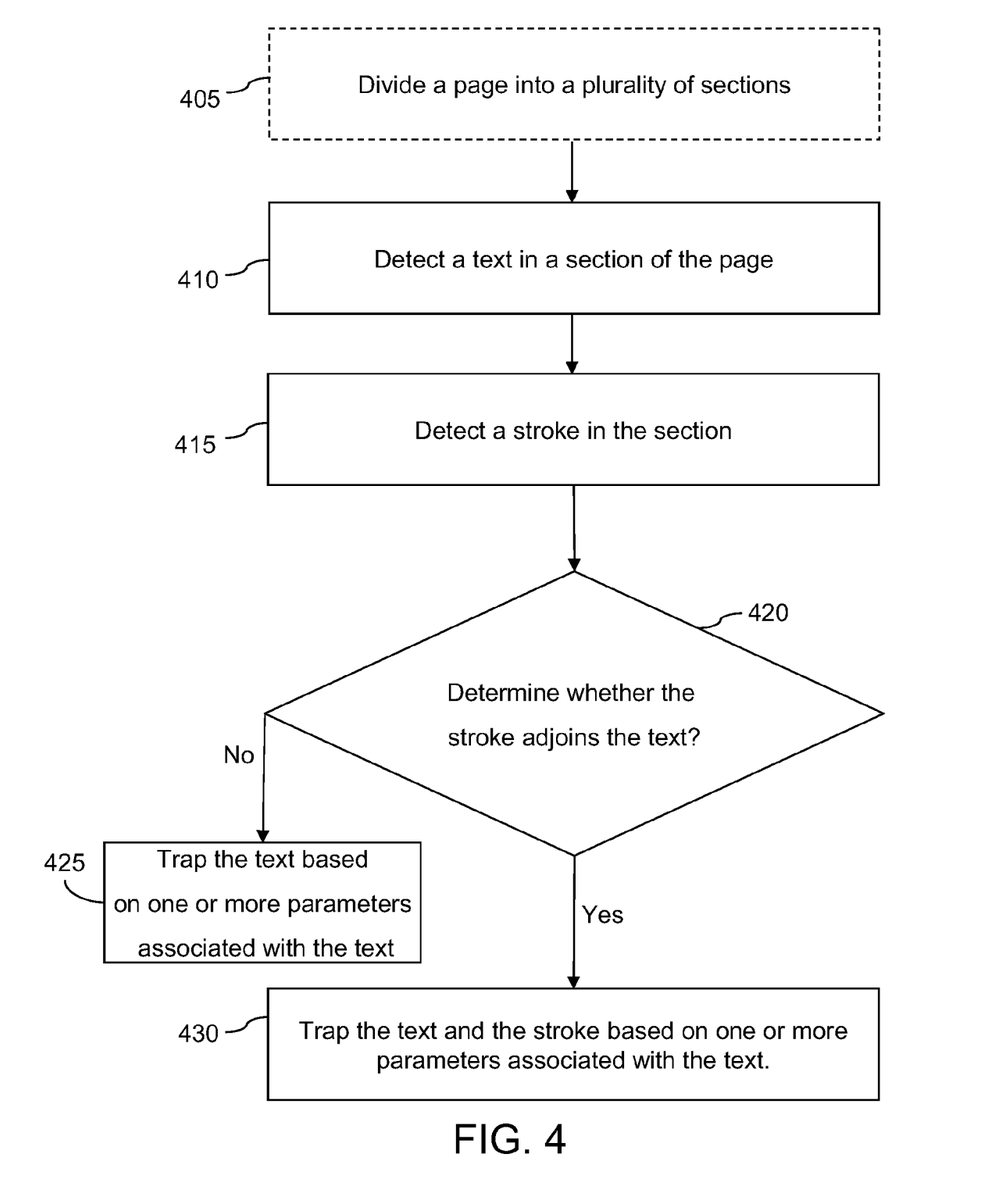
FIG. 4 is a flow diagram illustrating a method for trapping a text and a stroke in accordance with one embodiment.

The method of applying one or more parameters, for example trapping parameters, associated with a text to a stroke is explained in detail in conjunction with FIG. 4.

FIG. 4 is a flow diagram illustrating a method for trapping a text and a stroke adjoining the text in accordance with one embodiment of the present disclosure.

At step 405, a page is divided into a plurality of sections. Each section includes one or more polygons. A polygon may include a line. A page may include one or more sections.

The size of each section may be predefined, for example, 2×2 inches. In another aspect, the size of a section may be defined by a user.

It will be appreciated that the sections may be in any shape as desired, for example, rectangular.

In one embodiment, step 405 may be bypassed and one or more polygons of a section may be received.

In one embodiment, one or more steps from steps 410 to 430 are performed for each section.

At step 410, the text is detected in the section of the page. The text is detected by determining presence of a polygon including the text.

In one embodiment, step 405 may be included in step 410.

Thereafter, at step 415, a stroke is detected in the section. The stroke is detected by determining presence of a polygon including the stroke. Iterations may be performed over the one or more polygons to determine if the one or more polygons include the polygon including the stroke.

At step 420, a check is performed to determine whether the stroke adjoins the text. In one embodiment, the check is performed by determining whether the stroke is present within a predefined distance from the text. A line may be defined at a predefined distance from the text or the text polygon. In some embodiments, the predefined distance may be three points. A point may be equal to seventy second part (1/72) of an inch.

If the stroke or the polygon including the stroke is present between the text and the line, then the stroke is identified as the stroke adjoining the text. In one embodiment, the stroke adjoining the text includes the stroke surrounding the text.

In one embodiment, the stroke includes a set of paths, for example, combination of several closed loops or lines, a closed loop, or a line. The stroke adjoining the text or various parts of the text may be considered as a single stroke adjoining the text.

It will be appreciated that the stroke may be of same color as the text or of different color than the text.

If the stroke adjoins the text then step 430 is performed. At step 430, the text and the stroke are trapped based on the one or more parameters associated with the text. The one or more parameters include trapping parameters associated with width of a trap. The one or more parameters also include rules associated with the object of the first type. In one embodiment, the one or more parameters may be predefined. In another embodiment, the one or more parameters may be defined by the user.

In one embodiment, the text and the stroke are considered as a combination object, and all parameters associated with the text are applied to the combination object while trapping. For example, width of a trap around the text and the stroke is made similar. In another embodiment, the parameters associated with the text may be applied in a predefined ratio to the stroke. For example, trap width of the stroke may be in the predefined ratio to the trap width of the text. The predefined ratio may be set by the user.

Examples of the one or more parameters include but are not limited to:

Example 1

Small Text Limit: If size of a font is lesser than this limit, then the font is identified as "Small Text" and follows the specification set by "Small Text Trap Width Scaling".

Small Text Trap Width Scaling: This parameter may take any value from 0.0 to 1.0. A trap width of the "Small Text" is scaled by an amount set by this value.

In one embodiment, trap width of the stroke adjoining the "Small Text" is made similar to the trap width of the "Small Text".

Example 2

Text Trap Placement: This parameter specifies whether to spread the text or choke the text depending upon the color of the text and the color of the abutting object. If it is "spread", colorants of the text seep out. If it is "choke", the colorants outside the text seep in.

Small Text Trap Placement Limit: If size of a font is lesser than this limit, then the font is identified as "Small Text" and follows the specification set by "Small Text Trap Placement"

Small Text Trap Placement: This is similar to "Text Trap Placement" and applies to the "Small Text".

In one embodiment, spreading of the stroke adjoining the "Small Text" is performed if spreading of the "Small Text" is performed, or choking of the stroke adjoining the "Small Text" is performed if choking of the "Small Text" is performed.

It will be appreciated that the one or more parameters associated with the text may also be applied to the stroke adjoining the text while performing other functions.

It will also be appreciated that one or more parameters associated with the stroke may be applied to the text based on user needs or functions that need to be performed on the text and the stroke.

If at step 420 it is determined that the stroke does not adjoin the text then step 425 is performed. At step 425, the text is trapped based on the one or more parameters associated with the text.

It will be appreciated that one or more steps from steps 410 to 430 may be performed simultaneously or one by one for each section.

In one embodiment, one or more steps of the method described in FIG. 4 may be implemented by means of instructions included in a machine-readable medium. Examples of such a medium include but are not limited to memory devices, tapes, disks, cassettes, integrated circuits, servers, magnetic media, optical media, online software, download links, installation links, and online links.

Figure 5:
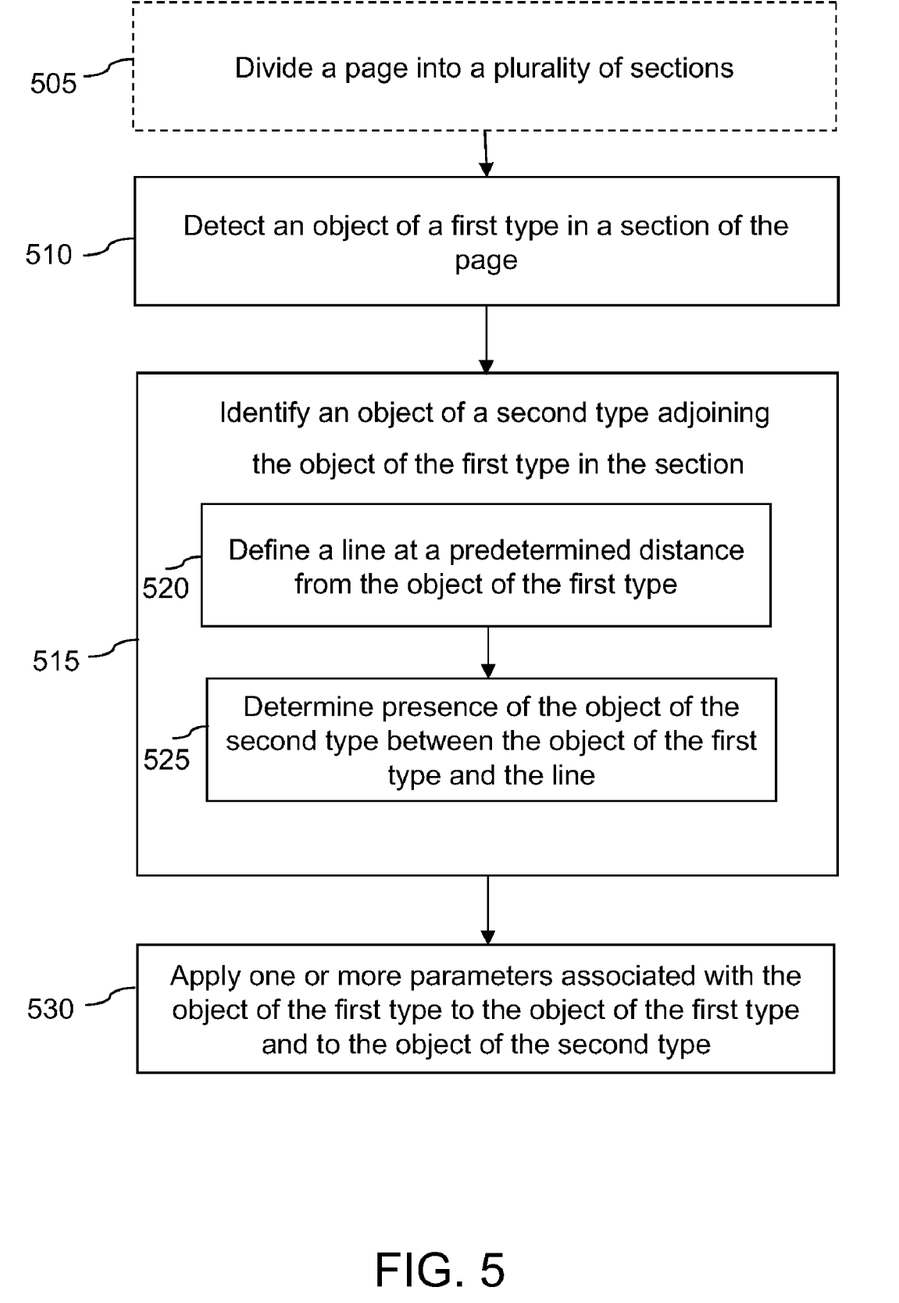
FIG. 5 is a flow diagram illustrating a method for applying one or more parameters to objects in accordance with another embodiment.

FIG. 5 is a flow diagram illustrating a method for applying one or more parameters on objects in accordance with another embodiment of the present disclosure.

At step 505, a page is divided into a plurality of sections. Each section includes one or more polygons. A page may include one or more sections.

In one embodiment, step 505 may be bypassed and one or more polygons of a section may be received.

In one embodiment, one or more steps from steps 510 to 530 are performed for each section.

At step 510, an object of a first type is detected in the section of the page. The object of the first type is detected by determining presence of a polygon including the object of the first type.

In one embodiment, the object of the first type includes a visible entity which is acted upon. Examples of the object of the first type include but are not limited to a textual element, a text, a picture, an image, a graphical element, and a drawing.

It will be appreciated that the object of the first type may include any object having distinct trapping parameters.

In one embodiment, step 505 may be included in step 510.

Thereafter, at step 515, an object of a second type adjoining the object of the first type is identified in the section. A check is performed to determine presence of the object of the second type within a predefined distance from the object of the first type. In one embodiment, the check is performed by defining a line at a predefined distance from the object of the first type at step 520. A line may be defined at the predefined distance from the object of the first type or the polygon including the object of the first type.

At step 525, presence of the object of the second type or the polygon including the object of the second type is determined between the object of the first type and the line. The object of the second type is then identified as the object of the second type adjoining the object of the first type.

In one embodiment, the object of the second type includes a visible entity. Examples of the object of the second type include but are not limited to a stroke and a fill.

At step 530, one or more parameters associated with the object of the first type are applied to the object of the first type and to the object of the second type.

In one embodiment, applying the one or more parameters includes applying trapping parameters associated with the object of the first type.

It will be appreciated that the one or more parameters applied to the object of the second type may be in a pre-defined ratio to the one or more parameters associated with the object of the first type. The pre-defined ratio may be defined by a user.

It will also be appreciated that the one or more parameters associated with the object of the second type may be applied to the object of the first type based on the type of objects, user needs or functions that needs to be performed on both the objects.

It will be appreciated that one or more steps from steps 510 to 530 may be performed simultaneously or one by one for each section.

In one embodiment, one or more steps of the method described in FIG. 5 may be implemented by means of instructions included in a machine-readable medium. Examples of such a medium include but are not limited to memory devices, tapes, disks, cassettes, integrated circuits, servers, magnetic media, optical media, online software, download links, installation links, and online links.

Figure 6:
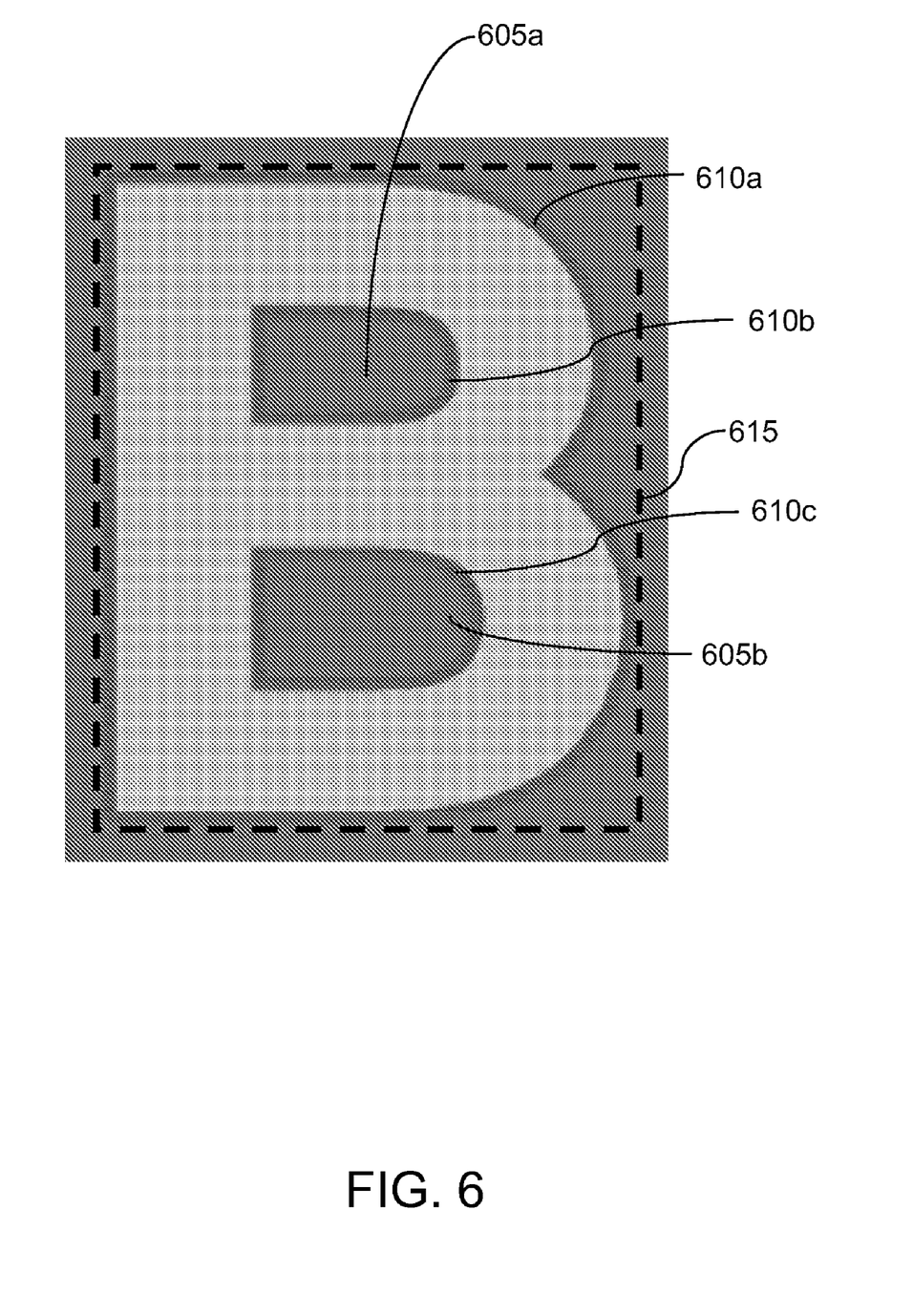
FIG. 6 is an exemplary representation illustrating a trapped combination object in accordance with one embodiment.

An exemplary representation of a text and a stroke adjoining the text trapped by using, for example, the method of FIG. 4 is illustrated in FIG. 6.

FIG. 6 is an exemplary representation illustrating a trapped combination object 615 including a trapped letter "B" and a trapped stroke adjoining the letter "B" (not distinguishable as text and stroke are in same color) in accordance with one embodiment of the present disclosure.

Traps 610a, 610b and 610c are obtained from trapping by using, for example, the method of FIG. 4 and give a pleasant appearance. Further, thin width of traps 610b and 610c does not cover portions 605a and 605b of the background, giving the trapped combination 615 an enhanced appearance.

In one embodiment, the letter "B" has three portions of stroke (not distinguishable as text and stroke are in same color) which are considered as a single stroke. The three portions include an outer portion of the stroke surrounding the letter "B", and two inner portions (surrounding traps 610b and 610c) on inner boundaries of the letter "B". The three portions are considered as the single stroke adjoining the letter "B" for purpose of trapping.

Figure 7:
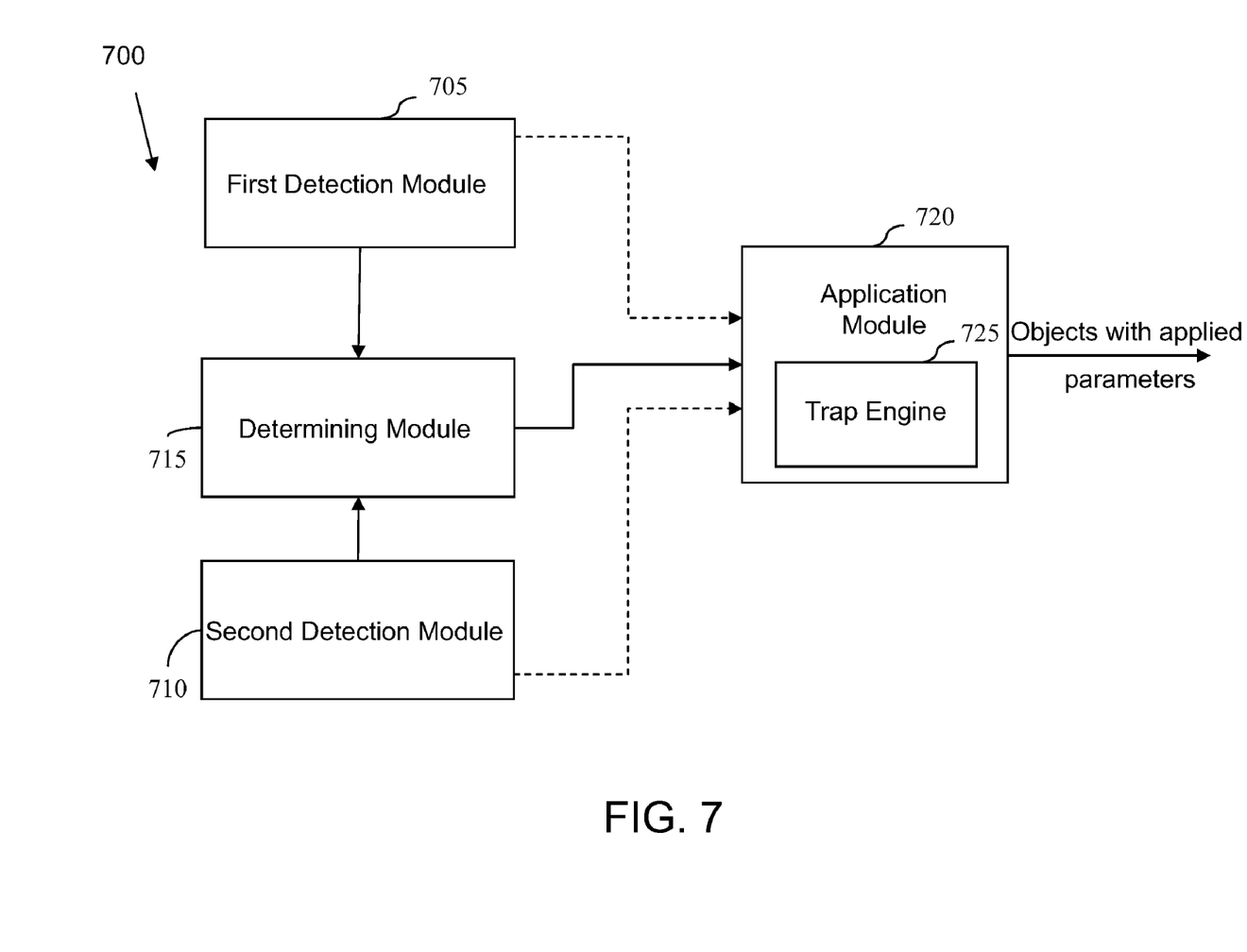
FIG. 7 is a block diagram of a system in accordance with one embodiment.

FIG. 7 is a block diagram of a system 700 in accordance with one embodiment of the present disclosure. System 700 includes a first detection module 705, a second detection module 710, and an application module 720.

First detection module 705 detects an object of a first type, for example, a text. Second detection module 710 detects an object of a second type, for example, a stroke. Application module 720 then applies one or more parameters, for example, trapping parameters associated with the object of the first type on both objects, if the object of the second type adjoins the object of the first type.

In one embodiment, second detection module 710 may be included in first detection module 705 and vice versa.

In one embodiment, system 700 also includes a determining module 715 for determining whether the object of the second type adjoins the object of the first type, for example, whether the stroke adjoins the text. In another embodiment, application module 720 may perform functions of determining module 715. In yet another embodiment, determining module 715 may be included in application module 720.

In one embodiment, application module 720 includes a trap engine 725. Trap engine 725 traps both objects based on the one or more parameters associated with the object of the first type.

In one embodiment, system 700 also includes a division module for dividing a page including the objects into one or more sections.

Various embodiments of the present disclosure provide better trapping by trapping the text and the stroke based on parameters associated with the text. Better trapping enhances appearance of the text and eliminates deformations.

While exemplary embodiments of the present disclosure have been disclosed, the present disclosure may be practiced in other ways. Various modifications and enhancements may be made without departing from the scope of the present disclosure. The present disclosure is to be limited only by the claims.

I claim:

1. A computer implemented method, comprising:
performing by a computer:
dividing a page into a plurality of sections;
detecting an object of a first type in a section from the plurality of sections of the page;
detecting an object of a second type in the same section;
determining that the object of the second type adjoins the object of the first type; and
based on said determining, applying trapping parameters associated with the object of the first type to the object of the first type and applying the same trapping parameters to the object of the second type without regard to trapping parameters associated with the object of the second type, wherein said applying results in a smaller trap width around the object of the second type than a trap width based on the trapping parameters associated with the object of the second type.

2. The method of claim 1, wherein the detecting of the object of the first type comprises:
determining presence of a polygon comprising the object of the first type in the section, wherein the section comprises one or more polygons.

3. The method of claim 1, wherein the detecting of the object of the second type comprises:
determining presence of a polygon comprising the object of the second type in the section, wherein the section comprises one or more polygons.

4. The method of claim 1, wherein the applying comprises:
applying trapping parameters associated with trap width of the object of the first type.

5. The method of claim 1 further comprising:
determining whether the object of the second type is present within a predefined distance from the object of the first type.

6. The method of claim 5, wherein the determining comprises:
defining a line at the predefined distance from the object of the first type; and
checking presence of the object of the second type between the object of the first type and the line.

7. A computer implemented method, comprising:
performing by a computer:
detecting a text in a section of a page;
detecting a stroke in the section;
determining that the stroke adjoins the text;
determining that a font of the text is smaller than a limit; and
based on said determining that the stroke adjoins the text, trapping the text and the stroke based on one or more parameters associated with the text without regard to one or more parameters associated with the stroke, wherein said trapping based on the one or more parameters associated with the text results in a smaller trap width than would a trapping based on the one or more parameters associated with the stroke.

8. The method of claim 7, wherein the detecting of the text comprises:
dividing the page into a plurality of sections, wherein each section comprises one or more polygons; and determining presence of a polygon comprising the text in the section.

9. The method of claim 7, wherein the detecting of the text comprises:
receiving one or more polygons of the section; and
determining presence of a polygon comprising the text.

10. The method of claim 7, wherein the detecting of the stroke comprises:
determining presence of a polygon comprising the stroke, wherein the section comprises one or more polygons.

11. The method of claim 7, wherein the trapping comprises:
trapping based on parameters associated with trap width of the text.

12. The method of claim 7 further comprising:
determining whether the stroke is present within a predefined distance from the text.

13. The method of claim 12, wherein the determining comprises:
defining a line at the predefined distance from the text; and
checking presence of the stroke between the text and the line.

14. A computer implemented method, comprising:
performing by a computer:
receiving one or more polygons of a section of a page;
detecting presence of an object of a first type in at least one polygon;
defining a line at a predetermined distance from the at least one polygon;
determining presence of an object of a second type between the line and the same at least one polygon; and
based on said determining, applying trapping rules associated with a trap width of the object of the first type to the object of the first type and applying the same trapping rules to the object of the second type without regarding to trapping rules associated with a trap width of the object of the second type;
wherein the trap width of the object of the first type is smaller than the trap width of the object of the second type.

15. A system, comprising:
a first detection module for detecting an object of a first type in a section of a page;
a second detection module for detecting an object of a second type in the same section, wherein the object of the second type adjoins the object of the first type; and
an application module for applying one or more parameters associated with the object of the first type to the object of the first type and applying the same one or more parameters to the object of the second type without regard to one or more parameters associated with the object of the second type, wherein said applying results in a smaller trap width around the object of the second type than a trap width based on the one or more parameters associated with the object of the second type.

16. The system of claim 15 further comprising:
a determining module for determining whether the object of the second type adjoins the object of the first type.

17. The system of claim 15, wherein the application module comprises:
a trap engine for applying trapping parameters associated with the object of the first type to the object of the first type and to the object of the second type.

18. A non-transitory machine-readable medium comprising instructions operable to cause a programmable processor to perform:
detecting an object of a first type in a section of a page;
detecting an object of a second type in the same section;
determining that the object of the second type adjoins the object of the first type; and
based on said determining, trapping the object of the first type and the object of the second type based on one or more parameters associated with the object of the first type without regard to one or more parameters associated with the object of the second type, wherein said trapping based on the one or more parameters associated with the object of the first type results in a smaller trap width than would a trapping based on the one or more parameters associated with the object of the second type.

19. The machine-readable medium of claim 18, wherein the detecting of the object of the first type comprises:
dividing the page into a plurality of sections, wherein each section comprises one or more polygons; and
determining presence of a polygon comprising the object of the first type in the section.

20. The machine-readable medium of claim 18, wherein the detecting of the object of the first type comprises:
receiving one or more polygons of the section; and
determining presence of a polygon comprising the object of the first type.

21. The machine-readable medium of claim 18, wherein the detecting of the object of the second type comprises:
determining presence of a polygon comprising the object of the second type, wherein the section comprises one or more polygons.

22. The machine-readable medium of claim 18, wherein the trapping comprises:
trapping based on parameters associated with trap width of the object of the first type.

23. The machine-readable medium of claim 18 further comprising:
instructions operable to cause a programmable processor to perform determining whether the object of the second type is present within a predefined distance from the object of the first type.

24. The machine-readable medium of claim 23, wherein the determining comprises:
defining a line at the predefined distance from the object of the first type; and
checking presence of the object of the second type between the object of the first type and the line.

* * * * *